May 26, 1959     F. P. COTY     2,887,844
ROCKET MOTOR
Filed May 17, 1952
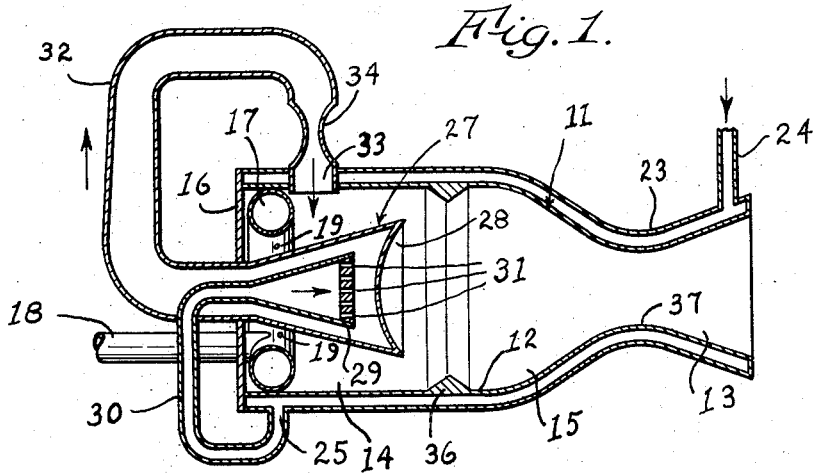
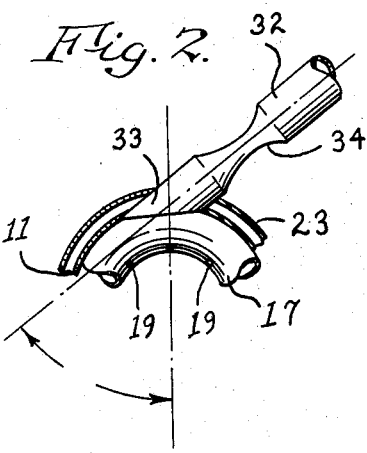
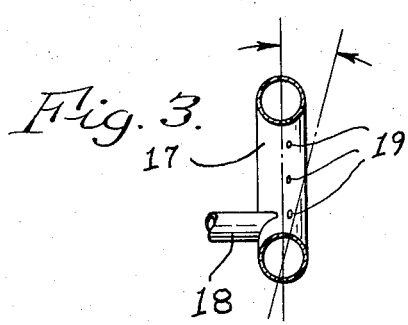
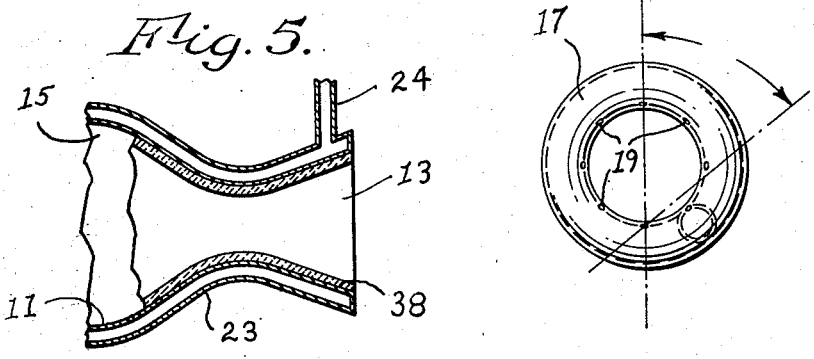
INVENTOR.
FRED P. COTY
BY
Ashlan J. Harlan Jr
Attorney

ROCKET MOTOR

Fred P. Coty, Niagara Falls, N.Y.

Application May 17, 1952, Serial No. 288,473

3 Claims. (Cl. 60—35.6)

The present invention relates to rocket motors and is particularly concerned with the construction of liquid fuel rocket motors.

It is an object of the invention to provide a rocket motor of novel construction which is extremely efficient.

Another object of the invention is to provide a liquid rocket motor in which the efficiency of the fuel combustion is greatly increased.

A further object of the invention is to provide in a rocket motor a chamber for mixing the propellants prior to their passage into the main combustion chamber.

Other objects and advantages of the present invention will be apparent from the following description taken in conjunction with the drawing in which:

Figure 1 is a longitudinal, sectional view through a rocket motor constructed in accordance with the present invention;

Figure 2 is a fragmentary sectional view showing the arrangement of an oxidizer inlet;

Figures 3 and 4 are detail views of the fuel manifold, and

Figure 5 is a fragmentary view of a motor in accordance with the invention in which the nozzle and combustion chamber are lined with refractory material.

Referring to Figure 1, it will be seen that the motor comprises a casing 11 which provides a body portion 12 and a nozzle portion 13. The body portion 12 contains an annular mixing chamber 14 and a main combustion chamber 15. The end of the casing 11 opposite the nozzle portion 13 is closed by a plate 16 which extends outwardly around the periphery of the casing.

Within the body portion 12 at the end adjacent the plate 16 there is provided a fuel manifold 17 which preferably is toroidal in shape and is concentric with the casing. A fuel inlet pipe 18 extends rearwardly through the closure plate 16 from the manifold and a plurality of perforations or ports 19 through which fuel may be admitted to the mixing chamber 14 are provided in the manifold. As shown in Figures 3 and 4 the ports 19 are arranged angularly, as shown by the broken lines in Figures 3 and 4, each of the ports 19 is preferably arranged at an angle of approximately 10° from a plane normal to the axis of the casing 11 and passing through the center of the manifold 17 and at an angle of approximately 56° from the axial plane of the casing that passes through said port. The fuel streams entering through the ports 19 are thus given a whirling, forward motion.

The casing 11 is enclosed in a jacket 23. Adjacent the outlet of the nozzle portion 13 an oxidizer inlet 24 to the space between the jacket 23 and casing 11 is provided. Adjacent the plate 14 at the other end of the motor an outlet 25 is provided through the jacket 23 from the space between the jacket and the casing 11. Thus oxidizer may be admitted through the inlet 24, pass through the space between the jacket and the casing, and be withdrawn through the outlet 25.

Extending through the plate 16 into the body portion 12 of the motor is a heat exchanger 27 which is preferably circular in cross section and is concentric with the manifold 17 and the casing 11. The heat exchanger 27 is provided with flaring walls and its end is formed by a circular concave disc or head 28. Within the heat exchanger 27 there is concentrically arranged a hollow spray head 29 which is connected at one end by the pipe 30 to the outlet 25. At its other end the spray head 29 is provided with a plurality of ports 31 through which the oxidizer passes into the interior of the heat exchanger 27. A pipe or tube 32 is connected to the end of the heat exchanger 27 opposite the concave head 28 and leads to an oxidizer inlet nozzle 33 that extends through the jacket 23 and casing 11 into the mixing chamber 14 adjacent the fuel manifold 17. The nozzle 33 is also arranged to enter the casing 11 at an angle with respect to the vertical axial plane of the casing, the angle used (indicated by broken lines) preferably being the same as that of the ports 19 in the fuel manifold 17, i.e. approximately 56°. Adjacent the nozzle 33 the tube 32 is restricted as by a venturi 34.

The interior of the casing 11 is provided with an annular deflection ring 36 between the heat exchanger 27 and the throat 37 of the nozzle portion 13. The ring 36 projects inwardly into the main combustion chamber 15 and is provided with converging, preferably curved sides for better deflection of gases.

The metal parts of the rocket motor of the present invention are preferably formed of corrosion resistant metal such as stainless steel or titanium. In some cases, it may be desired to provide a lining in all or part of the mixing chamber, combustion chamber and nozzle. Such lining, indicated by the reference numeral 38 in Figure 5, may be formed of a suitable refractory material. Among the refractories which may be used are silicon carbide, graphite, and zirconium oxide.

The motor of the present invention may be used with a variety of propellants. Thus, for example, the oxidizer may be red or white fuming nitric acid and the fuel may be gasoline, kerosene, or other low boiling petroleum fractions, such as those used as fuels for jet engines. Other oxidizers such as concentrated hydrogen peroxide or liquid oxygen may be used and other fuels such as alcohol, aniline and hydrazine may also be employed, it being understood that variations in the fuel and oxidizer employed will produce variation in the combustion temperatures, combustion gas velocity, and thrust of the motor.

The operation of the motor of the present invention is as follows. A suitable oxidizer such as fuming nitric acid is supplied in liquid form through the inlet 24 to the space between the casing 11 and the jacket 23. The oxidizer flows through said space to the opposite end of the motor and is carried through the outlet 25 and pipe 30 to the spray head 29. It there passes through the ports 31 into the interior of the heat exchanger 27 in which it is vaporized. The oxidizer, in vapor or gaseous form, then passes through the tube 32, venturi 34 and nozzle 33 into the annular mixing chamber 14. Liquid fuel such as gasoline is supplied to the manifold 17 through the inlet 18 and issues as a plurality of jets through the ports 19 into the mixing chamber 14. Both the fuel jets and the oxidizer introduced through the nozzle 33 enter the mixing chamber at an angle and, therefore, are given a swirling motion around the heat exchanger 27. Suitable controls are provided for the feed lines to the fuel inlet 18 and the oxidizer inlet 24 to permit regulation of the flow of fuel and oxidizer and to provide for quickly stopping the flow in the event of rupture of the motor casing or other accident. Such controls are well known and need not, therefore, be described in detail.

The fuel issuing from the ports 19 into the mixing chamber 14 is ignited in any suitable manner. If the fuel being used is not spontaneously inflammable with the oxidizer employed, it may be ignited by an igniter (not shown) such as is frequently used with jet engines and rocket motors, or there may be preliminarily fed into the motor through the fuel inlet 18 a limited amount of a fuel which spontaneously ignites upon contact with the oxidizer. The admission of a small quantity or slug of a spontaneously combustible fuel may be carried out automatically when the motor is started by known arrangements of valves in the fuel supply system and provision of a tank of the spontaneously combustible, auxiliary fuel.

The combustion gases resulting from burning of the fuel pass from the mixing chamber 14 around the inner end of the heat exchanger 27 into the main combustion chamber 15 where combustion is completed. The high temperature products of combustion escape from the chamber 15 through the nozzle portion 13, the thrust or reaction thereof against the motor providing the power obtained therefrom. In passing through the area around the inner end of the heat exchanger, which area is at least four and preferably at least five times the area of the throat 37 of the nozzle, the burning gas is directed against the ring 36 which deflects it toward the center of the main combustion chamber 15. By thus providing turbulence within the chamber 15 the fuel is completely burned and the efficiency of the motor is increased.

The wall of the casing 11 is cooled by the oxidizer passing over its outer surface through the space between the casing and the jacket 23 and the heat exchanger 27 is also cooled by the oxidizer sprayed against the head 28 through the ports 31. Absorption of heat from the walls of the heat exchanger converts the liquid oxidizer into a vapor or gas in which form it is introduced into the motor. It will, of course, be evident that the oxidizer and fuel must be supplied to the motor at pressures substantially in excess of the pressure existing within the motor as a result of the combustion of the fuel. The venturi 34 in the oxidizer supply tube 32 not only serves to assist in providing a uniform stream of oxidizer through the nozzle 33, but also tends to prevent possibility of flash-back into the oxidizer tube. The concave surface of the disc or head 28 of the heat exchanger 27 tends to deflect gases in the main combustion chamber 15 outwardly and direct them into the stream of gas flowing from the mixing chamber 14 to the chamber 15. The inclined or curved surface of the deflection ring 36 on the side thereof toward the nozzle is effective for the same purpose.

From the foregoing description it will be seen that the rocket motor of the present invention is very efficient as a result of the provision of the mixing chamber in which the fuel and oxidizer are intimately mixed and fed smoothly through the area of reduced cross section around the inner end of the heat exchanger into the main combustion chamber in which burning of the fuel is completed.

It will be understood that many variations and modifications of the structure shown and described may be made without departing from the spirit of the invention. Thus, although one oxidizer inlet nozzle is satisfactory for motors of small diameter, where motors of greater diameter, with more power, are desired, additional, similar nozzles may be provided. The number of perforations or ports in the fuel manifold may also, of course, be varied, a larger number being required for larger motors. Additional inlets to the fuel manifold may also be provided in large motors to prevent undesirable pressure drop in some portions of the manifold. Further, the deflection ring 36 may be integral with the casing 11 or may be formed separately and secured in place by suitable means. Where particularly high temperatures are encountered the deflection ring may be hollow and cooled by circulation therethrough of oxidizer, fuel or other cooling fluid. Although in the foregoing description the operation of the rocket motor of the present invention with liquid fuel has been described, it is possible, if desired, to utilize pulverized solid fuel instead. The field of utility of the motor is thus greatly widened. It is, therefore, intended that the invention shall not be considered as limited by the precise details of the construction given herein, but shall be interpreted as broadly as permitted by the appended claims.

I claim:

1. A rocket motor comprising a casing, said casing having a body portion and a nozzle portion, a heat exchanger projecting into said body portion concentrically with said casing, an annular mixing chamber within said body portion and extending longitudinally thereof, said mixing chamber being around and formed in part by said heat exchanger, a main combustion chamber within said body portion intermediate said mixing chamber and said nozzle portion and aligned therewith, the outlet from said mixing chamber to said main combustion chamber being a relatively restricted annulus at the periphery of said mixing chamber, means comprising a manifold for introducing fuel tangentially into said mixing chamber, other distinct means for introducing an oxidizer tangentially into said mixing chamber, and a continuous annular deflection ring within said main combustion chamber longitudinally spaced from said restricted outlet and constructed to direct fuel and oxidizer mixture passing from said mixing chamber away from the wall of said main combustion chamber.

2. A rocket motor as set forth in claim 1 in which said manifold is within said mixing chamber and said means for introducing oxidizer includes said heat exchanger.

3. A rocket motor as set forth in claim 1 in which said heat exchanger increases in cross section inwardly of said body portion.

References Cited in the file of this patent

UNITED STATES PATENTS

| | | |
|---|---|---|
| 2,016,921 | Goddard | Oct. 8, 1935 |
| 2,142,601 | Bleecker | Jan. 3, 1939 |
| 2,286,909 | Goddard | June 16, 1942 |
| 2,510,571 | Goddard | June 6, 1950 |
| 2,536,598 | Goddard | Jan. 2, 1951 |
| 2,544,419 | Goddard | Mar. 6, 1951 |
| 2,551,115 | Goddard | May 1, 1951 |
| 2,555,081 | Goddard | May 29, 1951 |
| 2,563,028 | Goddard | Aug. 7, 1951 |
| 2,576,678 | Goddard | Nov. 27, 1951 |
| 2,602,290 | Goddard | July 8, 1952 |
| 2,695,496 | Goddard | Nov. 30, 1954 |